United States Patent
Mu et al.

(10) Patent No.: US 12,522,682 B2
(45) Date of Patent: Jan. 13, 2026

(54) SYNTHESIS OF METHYL 2-FLUOROACRYLATE

(71) Applicant: Vifor (International) Ltd., St. Gallen (CH)

(72) Inventors: Yongqi Mu, Los Altos, CA (US); Jessica Brunke, St. Gallen (CH)

(73) Assignee: VIFOR (INTERNATIONAL) LTD., St. Gallen (CH)

(*) Notice: Subject to any disclaimer, the term of this patent is extended or adjusted under 35 U.S.C. 154(b) by 534 days.

(21) Appl. No.: 17/907,459

(22) PCT Filed: Mar. 27, 2021

(86) PCT No.: PCT/IB2021/052549
§ 371 (c)(1),
(2) Date: Sep. 27, 2022

(87) PCT Pub. No.: WO2021/191876
PCT Pub. Date: Sep. 30, 2021

(65) Prior Publication Data
US 2023/0126376 A1    Apr. 27, 2023

Related U.S. Application Data

(60) Provisional application No. 63/000,886, filed on Mar. 27, 2020.

(51) Int. Cl.
*C08F 220/22* (2006.01)
*C07C 67/08* (2006.01)
*C07C 67/307* (2006.01)

(52) U.S. Cl.
CPC ............ *C08F 220/22* (2013.01); *C07C 67/08* (2013.01); *C07C 67/307* (2013.01); *C08F 2810/20* (2013.01)

(58) Field of Classification Search
CPC .................................................. C07C 51/363
See application file for complete search history.

(56) References Cited

U.S. PATENT DOCUMENTS

| | | |
|---|---|---|
| 7,304,191 B2 | 12/2007 | Mathieu et al. |
| 2011/0313177 A1 | 12/2011 | Mecfel-Marczewski et al. |
| 2019/0176134 A1 | 6/2019 | Xu et al. |

FOREIGN PATENT DOCUMENTS

| | | | | |
|---|---|---|---|---|
| CN | 107417524 A | * | 12/2017 | ............ C07C 41/30 |
| EP | 3293167 A1 | | 3/2018 | |
| WO | 2010022383 A2 | | 2/2010 | |
| WO | 2014/058905 A2 | | 4/2014 | |
| WO | 2018046662 A1 | | 3/2018 | |
| WO | 2019025467 A1 | | 2/2019 | |

OTHER PUBLICATIONS

Roesky (Efficient Preparations of Fluorine Compounds, Chapter 58: Preparation of α-Fluoro Amino and α-Fluoro Enamino Reagents, 2013, Wiley, p. 379).*
Machine translation of CN 107417524 (2017, 9 pages).*
Vints et al., "Fluorination of unsaturated carbonyl compounds using elemental fluorine", Tetrahedron, 72, 2016, 5 pages.
Lu et al., Organic Chemistry, 5th edition, Jan. 2002, 5 pages.
Huang et al., "Sulfonation dehalogenation reaction and applications thereof", Hebei Education Publishing House, Apr. 2003, 3 pages.
Lu, Zhichao et al., Solventless and metal-free regioselective hydrofluorination of functionalized alkynes and allenes: an efficient protocol for the synthesis of gem difluorides, Green Chemistry 2019, 21, pp. 1467-1471.
Li, Lingchun et al., Deoxyfluorination of alcohols with 3,3-difluoro-1,2-diarylcyclopropenes, Nature Communications, 2016, 11 pages.
Lu, Zhichao et al., Widely Applicable Hydrofluorination of Alkenes via Bifunctional Activation of Hydrogen Fluoride, Journal of the American Chemical Society, 2017, 139, pp. 18202-18205.
Lu, Zhichao et al., Multifaceted ion exchange resin-supported hydrogen fluoride: a path to flow hydrofluorination, Green Chemistry, 2018, 5 pages.
Molnar, Istvan Gabor et al., Catalytic Difluorination of Olefins, Journal of the American Chemical Society, 2016, 138, pp. 5004-5007.
Okoromoba, Otome E. et al., Designer HF-Based Fluorination Reagent: Highly Regioselective Synthesis of Fluoroalkenes and gem-Difluoromethylene Compounds from Alkynes, Journal of the American Chemical Society, 2014, 136, pp. 14381-14384.
Wang, Chia-Lin J., Chapter 2—Fluorination by Sulfur Tetrafluoride, Organic Reactions, vol. 34 (1985), 69 pages.
Sedgwick, Daniel M. et al., Metal-Free and User-Friendly Regioselective Hydroxyfluorination of Olefins, Organic Letters, 2018, 20, pp. 2338-2341.
Elkik Elias et al., No. 299—Formyl fluoro cetones et esters. II.—Hydroxyalcoylation: stereochimie et deshydratation des fluorhydrines obtenues, Bulletin de la Societe Chimique de France, Society Francaise de Chimie, Paris, France, No. 7-8, Jan. 1, 1975, pp. 1633-1638.
Ochiai Bungo et al., Facile Synthesis of Glycidates via Oxidation of Acrylates with Aqueous Solution of NaOCl in the Presence of Ammonium Salts, Heterocycles, vol. 89, No. 2, Jan. 1, 2014, pp. 487-493.

* cited by examiner

*Primary Examiner* — Brieann R Johnston
(74) *Attorney, Agent, or Firm* — Stinson LLP

(57) ABSTRACT

Methods for the synthesis of methyl 2-fluoroacrylate (MFA) are provided. The methods include use of various hydrofluorination agents using a variety of starting materials and reaction schemes. The methyl 2-fluoroacrylate prepared by the methods described herein can further be used to prepare patiromer calcium sorbitex.

19 Claims, No Drawings

SYNTHESIS OF METHYL 2-FLUOROACRYLATE

CROSS-REFERENCE TO RELATED APPLICATIONS

This application is a 35 U.S.C. 371 National Phase application of International Application No. PCT/IB2021/052549 filed on Mar. 27, 2021, which claims benefit of U.S. Patent Application No. 63/000,886 filed on Mar. 27, 2020.

FIELD OF THE INVENTION

Methods for the synthesis of methyl 2-fluoroacrylate (MFA) are provided.

BACKGROUND OF THE INVENTION

Methyl 2-fluoroacrylate (MFA) is a raw material for manufacture of various polymeric products. Synthetic routes reported in the literature typically produce MFA in low yields and purity and/or the reagent expense makes them otherwise economically unviable. Current commercial routes of MFA synthesis involve the highly toxic starting material, methyl fluoroacetate (MFAc). In recent years, a series of new hydrofluoric acid (HF)-based fluorination reagents have been reported, but their application has been limited.

It is therefore, an object of the present disclosure to provide an improved process for the preparation of methyl 2-fluoroacrylate with high purity and high yield without the use of highly toxic starting materials. The present invention provides a process of preparation of methyl 2-fluoroacrylate which is simple, economically viable and industrially applicable in comparison to prior art processes. Specifically, the present disclosure provides a process for the preparation of methyl 2-fluoroacrylate using hydrofluorinating reagents.

BRIEF SUMMARY OF THE INVENTION

The disclosure is directed to various processes for preparing a fluoroacrylate compound.

For example, a process for preparing a fluoroacrylate compound of Formula 2 comprises contacting an alkyl propiolate compound of Formula 1 with a hydrofluorination agent in the presence of a catalyst to form the compound of Formula 2 is disclosed. The compound of Formula 1 corresponds to the following structure:

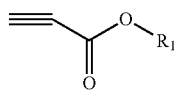

(1)

wherein $R_1$ is alkyl or aryl; the compound of Formula 2A corresponds to the following structure:

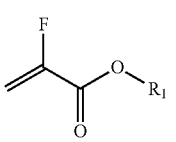

(2A)

wherein $R_1$ is defined above, provided when the hydroflulorination agent is 1,3-dimethyl-3,4,5,6-tetrahydro-2(1H)-pyrimidinone (DMPU) complex with HF (DMPU-HF), $R_1$ is methyl.

Another process for preparing a fluoroacrylate compound of Formula 2 comprises contacting a compound of Formula 4 with a hydrofluorination agent in the presence of a Lewis acid catalyst, a strong base and an alcohol to form the compound of Formula 2. The compound of Formula 4 corresponds to the following structure:

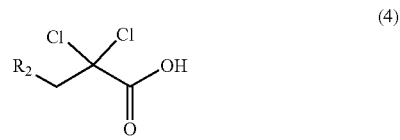

(4)

wherein $R_2$ is hydrogen, alkyl, or aryl; and the compound of Formula 2 corresponds to the following structure:

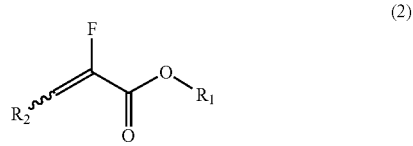

(2)

wherein $R_1$ is alkyl or aryl; and $R_2$ is defined above.

Yet another process for preparing a fluoroacrylate compound of Formula 2A comprises contacting a compound of Formula 5 with an epoxidation agent and a fluorination agent to form the compound of Formula 2A. The compound of Formula 5 corresponds to the following structure:

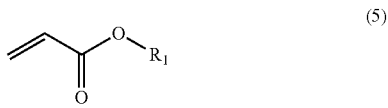

(5)

wherein $R_1$ is alkyl or aryl; and the compound of Formula 2A corresponding to the following structure:

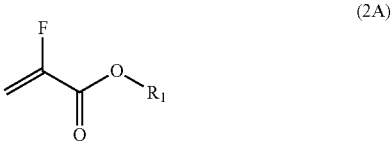

(2A)

wherein $R_1$ is defined above.

Another process for preparing a fluoroacrylate compound of Formula 2A comprises contacting a compound of Formula 6 with a strong base to form a dehydroflurinated intermediate and reacting the intermediate with an alcohol, $R_1OH$, and a strong acid to form the compound of Formula 2A; the compound of Formula 6 corresponding to the following structure:

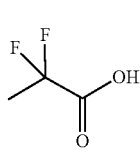

(6)

wherein $R_1$ is alkyl or aryl; and the compound of Formula 2A corresponds to the following structure:

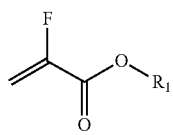

(2A)

wherein $R_1$ is defined above.

Additionally, the disclosure is directed to a process for preparing patiromer calcium sorbitex comprising preparing the fluoroacrylate of Formula 2A by the process described herein; forming a polymerization reaction mixture comprising divinyl benzene, 1,7-octadiene, and the fluoroacrylate of Formula 2A to form crosslinked alkyl(2-fluoroacrylate)-divinylbenzene-1,7-octadiene polymer; deprotecting the crosslinked alkyl(2-fluoroacrylate)-divinylbenzene-1,7-octadiene polymer to form crosslinked (2-fluoroacrylate)-divinylbenzene-1,7-octadiene polymer; contacting the crosslinked (2-fluoroacrylate)-divinylbenzene-1,7-octadiene polymer with a calcium salt to form crosslinked (calcium 2-fluoroacrylate)-divinylbenzene-1,7-octadiene polymer; swelling the crosslinked (calcium 2-fluoroacrylate)-divinylbenzene-1,7-octadiene polymer and contacting with sorbitol to form patiromer calcium sorbitex (i.e., sorbitol-loaded crosslinked (calcium 2-fluoroacrylate)-divinylbenzene-1,7-octadiene polymer).

Other objects and features will be in part apparent and in part pointed out hereinafter.

DETAILED DESCRIPTION OF THE INVENTION

This disclosure relates to routes for synthesis of methyl 2-fluoro acrylate (MFA) and related compounds.

Provided herein is a methyl propiolate route for synthesis of MFA and related compounds using a fluorinating reagent. Also provided herein is a halogen exchange route for the synthesis of MFA and related compounds using a fluorinating reagent. Also provided herein is a methyl acrylate-epoxide route for the synthesis of MFA and related compounds using a fluorinating reagent. Also provided herein is a difluoropropionic Acid (diFPA) route for the synthesis of MFA and related compounds using a fluorinating reagent.

Most fluorinating reagents are generated from hydrogen fluoride (HF) and typically offer the advantages of low cost and atom efficiency. Organic base-HF complexes, such as pyridine/HF complex ("Olah's reagent") and triethylamine/HF complex, have been used as nucleophilic fluoride sources. For example, a serine route of MFA synthesis has been reported, in which an HF-NEt$_3$ or HF-pyridine complex is used to introduce fluorine at the 2-position of 2-amino-3-hydroxy propanoic acid. (Maho, et al. Method of Producing 2-Fluoro-3-Halopropanoic Acid Derivative, JP2014214147 A, 2014)

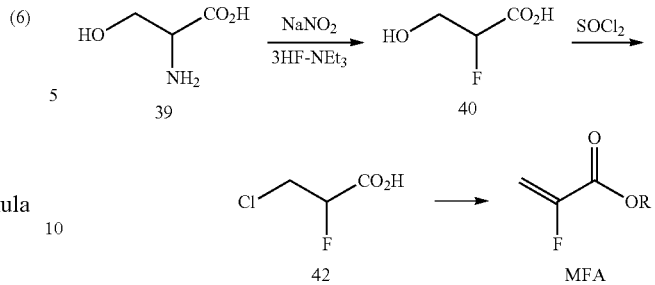

However, the HF-organic base complex has relatively low loading of HF, and for this reason large amounts of the HF reagent are required. This not only increases the cost but also complicates the purification process. Additionally, regioselectivity and yield of the desired haloacrylate compound is significantly different depending on the HF reagent used.

Another HF-based fluorination reagent has been reported in which the hydrogen-bond acceptor, 1,3-dimethyl-3,4,5,6-tetrahydro-2(1H)-pyrimidinone (DMPU) forms a complex with HF. (O E Okoromoba, et al. Designer HF-Based Fluorination. Reagent: Highly Regioselective Synthesis of Fluoroalkenes and gem-Difluoromethylene Compounds from Alkynes. J. Am. Chem. Soc. 2014, 136, 14381-14383.)

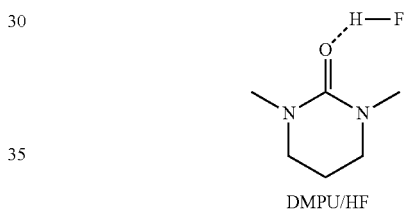

DMPU/HF

The DMPU-HF complex has a higher HF loading than HF-organic base complexes. (65 wt % HF loading, corresponds to an HF:DMPU molar ratio of around 11.8:1). While the DMPU-HF reagent has been reported to be compatible with cationic metal catalysts and to be highly regioselective for mono- and dihydrofluorination of alkynes, its application has been limited.

The DMPU-HF complex is reported to be acidic enough to activate the imidogold precatalyst (Au-1). In the monohydrofluorination of acceptor substituted terminal alkyne, the DMPU-HF—Au system was found to yield a reversed Michael addition product as the only regio-isomer with good yield. However, the purification to remove DMPU after the reaction remains challenging, especially for large scale synthesis. The DMPU-HF reagent is commercially available through several commercial vendors.

Scheme 1. Selectivity of the DMPU/HF/Au-1 Fluorination System (a)

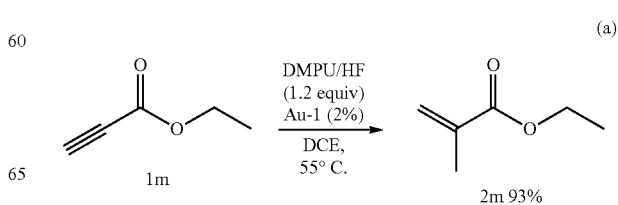

-continued

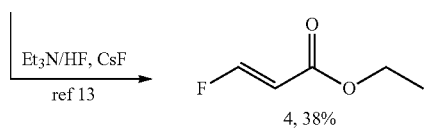

(b)

Another HF-based fluorination reagent is the KHSO$_4$—HF complex. KHSO$_4$—HF exists as a stable liquid at room temperature and has the highest reported HF loading (68 wt % of HF, corresponding to 13 mole of HF per mole of KHSO$_4$). (Z Lu, et al. Widely Applicable Hydrofluorination of Alkenes via Bifunctional Activation of Hydrogen Fluoride. J. Am. Chem. Soc. 2017, 139, 18202-18205)

The hydrogen bonding interaction of KHSO$_4$ and HF improves the nucleophilicity of HF and increases its acidity. This reagent is relatively inexpensive, scalable, easy to handle and environmentally benign. It is has been applied to the hydrofluorination of alkenes and alkynes. (B Xu, et al. Methods of Hydrofluorination, US20190176134A1, 2019)

The use of polymer supported HF complexes as fluorination reagents also has been reported. For example, amberlite resin, an inexpensive polymer, has been used as a solid support. (Z Lu, et al. Multifaceted ion exchange resin-supported hydrogen fluoride: a path to flow hydrofluorination. Green Chem. 2019, 1, 1-5) Anhydrous HF was absorbed to the polymer to form a stable solid HF reagent. The loading of HF on the polymer is reported as 30 wt %. This reagent can be packed into a plastic column and used in the hydrofluorination in a continuous flow process, which could significantly simplify the reaction workup process. After the reaction, the resin could be recycled and recharged with HF. This reagent is also commercially available through several vendors.

Alkyl Propiolate Route

One process to prepare a fluoroacrylate compound is to contact an alkyl propiolate compound of Formula 1 with a hydrofluorination agent. The compound of Formula 1 corresponds to the following structure:

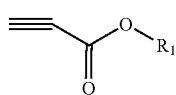

(1)

wherein $R_1$ is alkyl or aryl. The compound of Formula 1 is contacted with a hydrofluorination agent to produce a compound of Formula 2A. The compound of Formula 2A corresponds to the following structure:

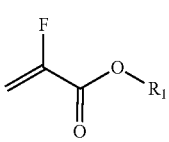

(2A)

wherein $R_1$ is alkyl or aryl.

When the hydrofluorination agent is 1,3-dimethyl-3,4,5, 6-tetrahydro-2(1H)-pyrimidinone (DMPU) complex with HF (DMPU-HF), $R_1$ in Formula 1 is methyl.

For the compound of Formula 1 or Formula 2, $R_1$ can be methyl, ethyl, propyl, butyl, pentyl, hexyl, or phenyl; preferably, $R_1$ can be methyl, ethyl, propyl, or butyl; more preferably, $R_1$ can be methyl.

The hydrofluorination agent can comprise a 1,3-dimethyl-3,4,5,6-tetrahydro-2(1H)-pyrimidinone (DMPU) complex with HF (DMPU-HF), or a reagent having the structure of Formula 3A, 3B, or 3C (collectively Formula 3).

$$MHSO_4\text{-}xHF \quad (3A),$$

$$M_2SO_4\text{-}xHF \quad (3B), \text{ or}$$

$$M^aSO_4\text{-}xHF \quad (3C).$$

For Formula 3, M can be $Li^+$, $Na^+$, $K^+$, $Rb^+$, $Cs^+$, or $NH_4^+$. Preferably, M can be $Na^+$, $K^+$, or $NH_4^+$; more preferably, M can be $K^+$.

For Formula 3C, $M^a$ can be $Be^{2+}$, $Mg^{2+}$, $Ca^{2+}$, $Sr^{2+}$, $Ba^{2+}$, $Fe^{2+}$, $Zn^{2+}$, $Mn^{2+}$, $Ni^{2+}$, $Co^{2+}$, or $Cu^{2+}$.

For Formula 3, x can be 1, 2, 3, 4, 5, 6, 7, 8, 9, 10, 11, 12, 13, 14, 15, or 16; additionally, x can be 6, 7, 8, 9, 10, 11, 12, 13, 14, 15, or 16; preferably, x can be 8, 9, 10, 11, 12, 13, or 14 (e.g., with Formula 3A); more preferably, x can be 13.

The MHSO$_4$, the M$_2$SO$_4$, or the M$^a$SO$_4$ have a hydrogen bond basicity (P) of about 7, about 8, about 9, about 10, about 11, about 12, about 13, about 14, about 15, or about 16.

The MHSO$_4$, the M$_2$SO$_4$, or the M$^a$SO$_4$ can also have a hydrogen bond basicity (P) of about 10, about 11, about 12, or about 13.

The MHSO$_4$, the M$_2$SO$_4$, or the M$^a$SO$_4$ can have a pKa of about 0.5, about 0.6, about 0.7, about 0.8, about 0.9, about 1.0, about 1.1, about 1.2, about 1.3, about 1.4, about 1.5, about 1.6, about 1.7, about 1.8, about 1.9, about 2.0, about 2.1, about 2.2, about 2.3, about 2.4, or about 2.5. Preferably, the MHSO$_4$, the M$_2$SO$_4$, or the M$^a$SO$_4$ can have a pKa of about 1.4, about 1.5, about 1.6, about 1.7, about 1.8, about 1.9, about 2.0, about 2.1, about 2.2, or about 2.3.

Any suitable solvent may be used. The solvents can include DCM (dichloromethane), DCE (1,2 dichloroethane), CH$_3$CN, DMSO (dimethyl sulfoxide), DMF (dimethyl formamide), toluene, or chlorobenzene. Preferably, the solvent is DCE, chlorobenzene, or toluene.

In particular, MFA can be synthesized by monohydrofluorination of alkyne using the DMPU-HF reagent and Au catalyst by the following reaction:

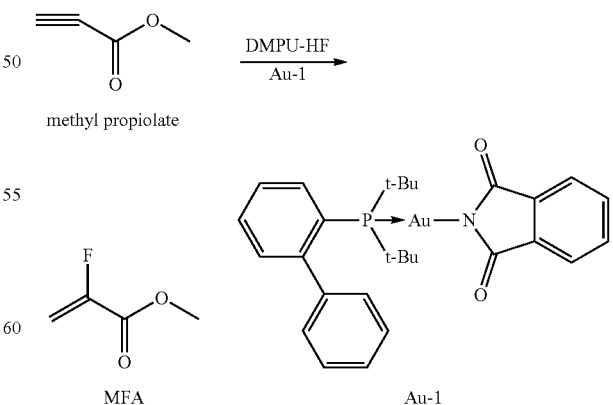

55° C. for 1 to 3 hours, preferably, about 2 hours. The reaction proceeds with a high conversion to MFA of greater than about 80%. The product can be assessed by HPLC.

Any suitable solvent may be used. However, solvents with lower boiling point such as dichloromethane (DCM) for this reaction should be avoided as the reaction does not proceed at room temperature. The choice of solvent also can affect the ability to isolate and purify the product. DMPU cannot be removed through aqueous workup and distillation is difficult when the boiling point of the solvent is very close to that of MFA. For example, distillation to separate product MFA from solvent dichloroethane is difficult because the boiling point of MFA (91° C.) and DCE (84° C.).

Furthermore the reaction does not proceed without a gold (Au) catalyst. Although palladium (Pd) catalysts are widely used in the pharmaceutical industry, elemental Au is less expensive than Pd.

Additionally, MFA can be synthesized by monohydrofluorination of alkyne using the $KHSO_4$-13HF reagent and Au catalyst by the following reaction:

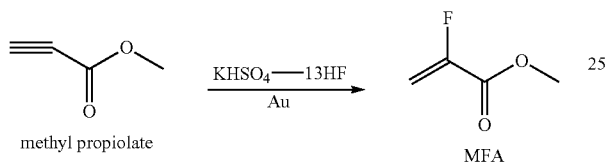

methyl propiolate                    MFA

The methyl propiolate, $KHSO_4$-13HF reagent and Au catalyst are combined in the presence of a suitable solvent, such as dichloroethane. The mixture is heated at about 50 to about 60° C. for about 2 to about 4 hours, preferably, about 3 hours. The reaction proceeds with a high conversion to MFA of greater than about 85%. The product can be assessed by HPLC.

One of the starting materials, methyl propiolate can be synthesized using acetylene from biomass waste, carbon dioxide ($CO_2$) recovered from waste streams and methanol. (J P Klein. Methods of producing dicarbonyl compounds as described in U.S. Pat. No. 10,131,610 B2, 2018) Methyl propiolate is also available commercially.

Halogen Exchange Route

The fluoroacrylate compound of Formula 2 can also be prepared by a halogen exchange reaction. For example, a compound of Formula 4 can be reacted with a hydrofluorination reagent (e.g., $KHSO_4$-13HF), a Lewis acid catalyst, a strong base, and an alcohol to form a compound of Formula 1. The compound of Formula 4 corresponds to the following structure:

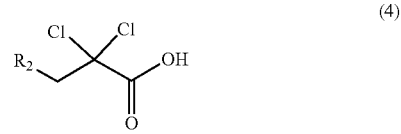

wherein $R_2$ is hydrogen, alkyl, or aryl; and
the compound of Formula 2 corresponds to the following structure:

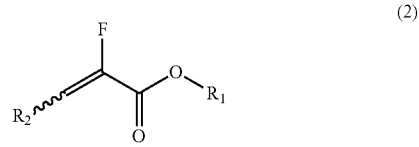

wherein $R_1$ is alkyl or aryl.

In general, the fluoroacrylate compound of Formula 1 can be prepared by the following reaction scheme, wherein $R_2$ is hydrogen, alkyl, or aryl; and $R_1$ is alkyl or aryl.

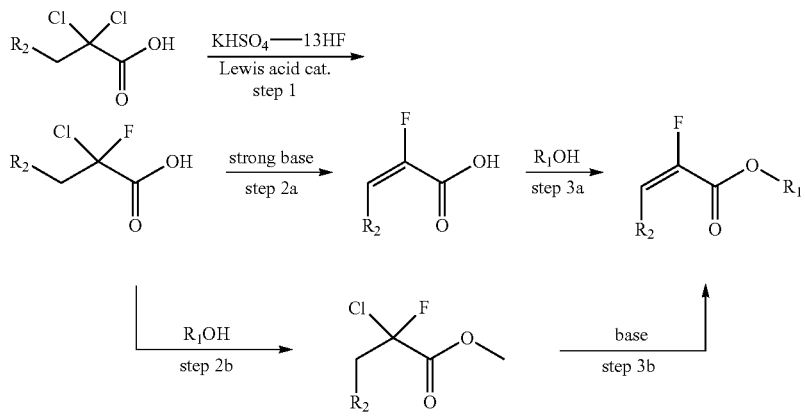

The reaction can be conducted in a stainless-steel hydrothermal autoclave reactor with a Teflon chamber. The reaction is heated, for example in an oil bath or dry armor chip bath.

Lewis acid catalysts are typically suitable for catalyzing the reaction. For example, $SnCl_4$ may be used as Lewis acid catalyst. This catalyst is very hygroscopic. The catalyst may be present at a concentration of from about 5 to about 20 mole %. Other suitable Lewis acid catalysts include $TiCl_4$, $AlF_3$, $CuF$ or $SbF_3$ as a catalyst for this reaction. However, $SbCl_5$ is not suitable as a catalyst as it did not yield an appreciable amount of the desired product.

The strong base can be selected from sodium hydroxide, potassium hydroxide, lithium hydroxide, calcium hydroxide, rubidium hydroxide, strontium hydroxide, cesium hydroxide, and barium hydroxide.

The selection of a suitable reaction temperature is important to reduce the formation of by-products and to improve the conversion. One of the competing reactions is the chlorine atom elimination to form 2-chloroacrylic acid at high temperature. At 80° C., no desired product formation was observed, while at 150° C., 2-chloroacrylic acid was observed as a major product. At temperature range from 100 to 120° C., desired product formation was observed on GC/MS.

For the compound of Formula 2, $R_2$ can be hydrogen, methyl, ethyl, propyl, butyl, pentyl, hexyl, or phenyl; preferably, $R_2$ can be hydrogen, methyl, ethyl, propyl, or butyl; more preferably, $R_2$ can be hydrogen.

The mole ratio of the starting material to $KHSO_4$-13HF reagent is 1 to 0.61. Since the HF content in the reagent is 65 wt %, the mole ratio of HF to dichloropropanoic acid is 7.9 to 1. The conversion of product could be further improved by increasing the amount of $KHSO_4$-13HF reagent in the reaction.

In particular, MFA can be synthesized by a halogen exchange in a reaction using the $KHSO_4$-13HF reagent according to the following reaction:

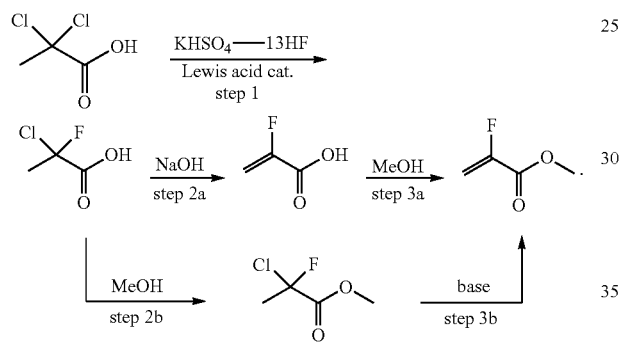

In the first step the $KHSO_4$-13HF reagent and a Lewis acid catalyst are added to 2,2-dichloropropionic acid to exchange of fluorine for chlorine, resulting in 2-chloro, 2-fluoropropionic acid. The use of anhydrous HF for Cl to F exchange has been reported. (V Mathieu, et al. Process for the Synthesis of Fluoroorganic Compounds. U.S. Pat. No. 7,304,191 B2, 2007) However, anhydrous HF is a dangerous gas and difficult to handle. Thus, use of the $KHSO_4$-13HF reagent offers advantages as a stable liquid and high acidity/nucleophilicity.

There are two routes for the formation of MFA from the product of step 1. In the first, NaOH as a base and water as solvent are used to generate 2-fluoroacrylic acid (FAA). This reaction has been reported to have a 90% yield. (V Mathieu, et al. Process for the synthesis of fluoroorganic compounds WO 2002012160, 2002) Then, 2-fluoroacrylic acid (FAA) can be methylated to form MFA. The methylation of FAA has been reported in R-21 route by Tianyu with a 92% yield. (K Cho, et al. A Kind of Preparation Method of 2-Fluorinated Monomer. CN 107417524B, 2019)

Alternatively, a methyl ester of the product of step 1 may be formed before HCl elimination to form MFA. The methyl ester formation from 2-chloro-2-fluoropropanoic acid can be achieved in one pot after step 1. The methyl ester formation has been observed in the analytical sample preparation, to which methanol was added to the crude reaction mixture and methyl ester peak was detected on GC/MS. This is followed by a HCl elimination (step 3b) to form MFA. Similar reactions have been reported in the literature. Typically, an organic base such as triethylamine can drive the elimination of HCl to give MFA in good yield. (L S Boguslavskaya, et al. Reactions of Halogen Fluorides. IX. Synthesis of α-Fluoroacrylic Scid Serivatives. Zhurnal Organicheskoi Khimii, 1987, 23 (6), 1173-7)

The starting material, 2,2-dichloropropionic acid, can be synthesized from propionic acid and chlorine in large quantity and low price. If not recovered, the cost of catalyst, $SnCl_4$, could contribute to the overall MFA cost significantly.

Alkyl Acrylate-Epoxide Route Using Acidic Nucleophilic Fluorination Reagents

Alkyl Acrylate-Epoxide Route Using Reagents Such as $KHSO_4$-13HF

The fluoroacrylate compound of Formula 2A can be prepared from an acrylate of Formula 5 that is reacted with a peroxy acid, in particular NaOCl, followed by a hydrofluorination reagent (e.g., $KHSO_4$-13HF) and elimination of water to form the compound of Formula 2A according to the following reaction.

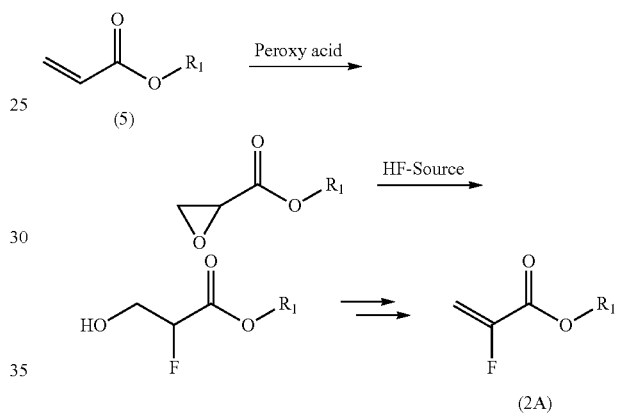

The compound of Formula 5 corresponds to the following structure:

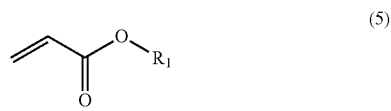

wherein $R_1$ is alkyl or aryl; and the compound of Formula 2A corresponds to the following structure:

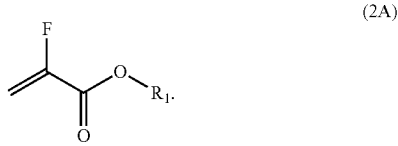

In particular, MFA and related compounds can be synthesized by a methyl acrylate-epoxide route using the $KHSO_4$-13HF reagent according to the following reaction.

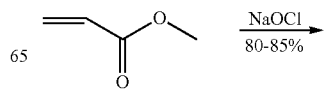

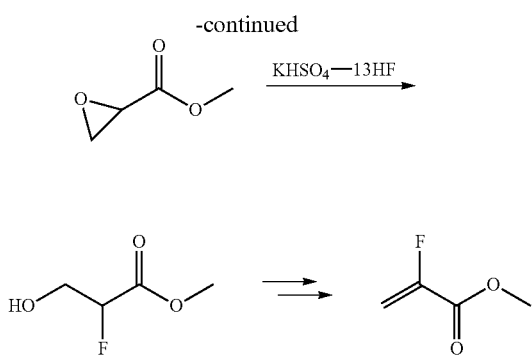

In the first step, methyl acrylate is epoxidized using standard reagents and procedures. For example, the methyl acrylate is reacted with suitable epoxidizing reagents, such as peracids, e.g. meta-chloroperoxybenzoic acid (m-CPBA), or NaOCl, in particular NaOCl, to form the terminal epoxide. This reaction has been reported with more than 80% yield. (B Ochiai and T Hirano. Pacile Synthesis of Glycidates via Oxidation of Acrylates with Aqueous Solution of NaOCl in the Presence of Ammonium Salts, Heterocycles, 2014, 99 (2), 487-493). In a second step, the epoxide is then opened using the HF-reagent, KHSO$_4$-13HF or KHSO$_4$-13HF combined with DMPU-HF (Hammond Green Chem., 2019, 21, 1467-1471), with desired regio-selectivity to form methyl 2-fluoro-3-hydroxypropanoate. The use of KHSO$_4$-13HF with DMPU-HF for epoxide opening has not been reported in the literature.

Beside the above-mentioned two-step procedure a one-pot synthesis to produce in-situ the epoxide directly followed by a ring-opening reagent to yield the hydrofluorine in one step has been reported (Xu et al., Metal-Free and User-Friendly Regioselective Hydroxyfluorination of Olefins Org. Lett. 2018, 20, 2338-2341). Generally, the following reaction scheme describes the synthesis of a compound of Formula 2A.

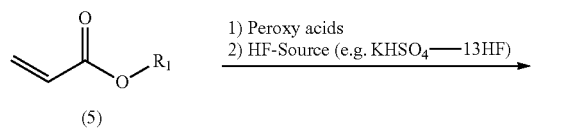

The use of KHSO$_4$-13HF in a one-pot procedure for epoxide opening has not been reported in the literature. MFA and related compounds can be synthesized by a methyl acrylate-epoxide one-pot route using first a suitable epoxidizing reagent, such as peracids, e.g. m-CPBA, or NaOCl, in particular m-CPBA, and afterwards a HF source or reagent is added to this mixture without isolation of the epoxide. A suitable HF source or reagent can be KHSO$_4$-13HF, (Xu, et al. Org. Lett. 2018, 20, 2338-2341), or Selectfluor, in particular KHSO$_4$-13HF, as the ring-opening reagent. A specific reaction scheme for preparing methyl alpha-fluoroacrylate is shown below.

The last step, formation of MFA from 2-fluoro-3-hydroxypropanoate, has been demonstrated at commercial scale. (M Kreis and J Kirchhoff. Preparation of Substituted 2-Fluoroacrylic Acid Derivatives. U.S. Pat. No. 9,000,210 B2, 2015)

Based on the proposed mechanism, under strong acidic conditions and with an epoxide adjacent to an electron withdrawing group (e.g., carbonyl group), hydrofluorination of a terminal epoxide generates the hydroxyl group at the terminal carbon and fluoride adds to the 2-position that is more nucleophilic (A Sattler and G Haufe. High Regioselectivity in the Alternative Aleavage of Terminal Epoxides with Different Sources of Nucleophilic Fluoride. Journal of Fluorine Chemistry, 1994, 69, 185-190). Sattler et al.'s proposed mechanism for the hydrofluorination of terminal epoxides is shown in the following scheme.

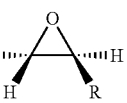

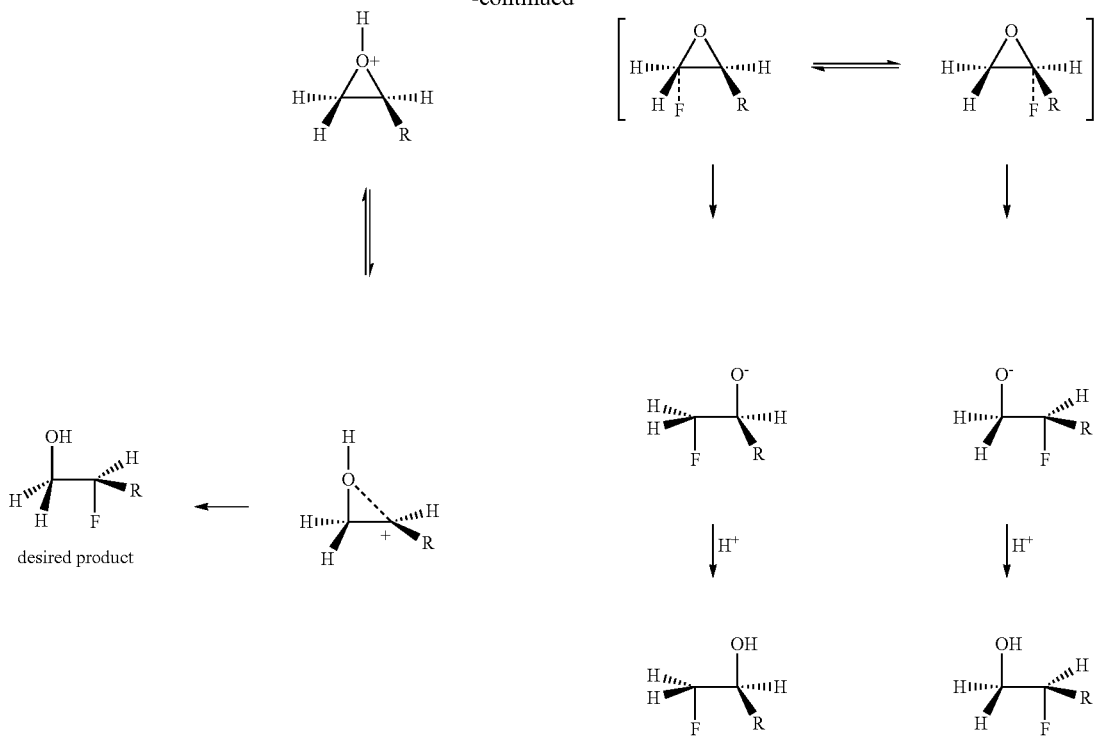

Alkyl Acrylate-Epoxide Route Using Deoxyfluorinating Reagents Such as SF$_4$ Reagent or Fluolead™ (4-tert-butyl-2,6-dimethylphenylsulfur trifluoride)

The fluoroacrylate compound of Formula 2A can also be prepared from an acrylate of Formula 5 that is reacted with a peroxy acid in particular NaOCl followed by a hydrofluorination reagent of SF$_4$, epoxide opening and addition of base (e.g., triethylamine) to dehydroflulorinate the intermediate to form the compound of Formula 2A. The compound of Formula 5 corresponds to the following structure:

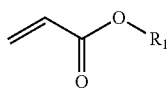

wherein R$_1$ is alkyl or aryl; and the compound of Formula 2A corresponds to the following structure:

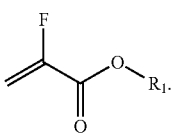

Generally, the compound of Formula 2A can be prepared according to the following reaction scheme.

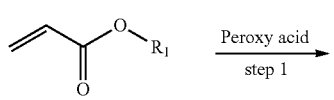

The key step is step 2 which is the epoxide opening using arylsulfur trifluorides, such as Fluolead™ (Li, L. et al. Deoxyfluorination of alcohols with 3,3-difluoro-1,2 diarylcyclopropenes. Nat. Commun. 7, 13320 (2016)) or sulfur fluorides and their derivatives (SF reagents), and in particular SF$_4$ reagents. There is a report of using SF$_4$ in the epoxide opening using ethyl oxirane-2-carboxylate as starting material in 53% yield (C-LJ Wang. Organic Reactions (Hoboken, NJ) volume 34, 1985). In this report they describe a fluorination of an oxirane. After reaction of SF$_4$ with the oxirane, the residue was dissolved in ether and NaF was added to the ether solution. In this invention NaF was not used in the work-up procedure but was used directly together with SF$_4$. A suitable solvent such as DCM can be used. Step 3 has been tested using triethylamine as the base.

Difluoropropionic Acid (diFPA) Route

The fluoroacrylate compound of Formula 2A can also be prepared from an acrylate of Formula 6 that is reacted with strong base to dehydrofluorinate the intermediate compound followed by reaction with R₁OH and a strong acid to form the compound of Formula 2A. The compound of Formula 6 corresponds to the following structure:

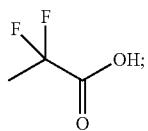

and the compound of Formula 2A corresponds to the following structure:

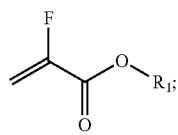

wherein R₁ is alkyl or aryl.

The strong base can be sodium hydroxide, potassium hydroxide, lithium hydroxide, calcium hydroxide, rubidium hydroxide, strontium hydroxide, cesium hydroxide, barium hydroxide, sodium methoxide, potassium methoxide, lithium diisopropylamide (LDA), or a combination thereof. Preferably, the strong base comprises sodium hydroxide and sodium methoxide.

Alternatively, the strong base comprises LDA.

The strong acid can be sulfuric acid, phosphonic acid, toluenesulfonic acid, or a combination thereof. Preferably, the strong acid comprises sulfuric acid.

In particular, MFA and related compounds can be synthesized by a difluoropropionic acid route, without the use of an HF reagent:

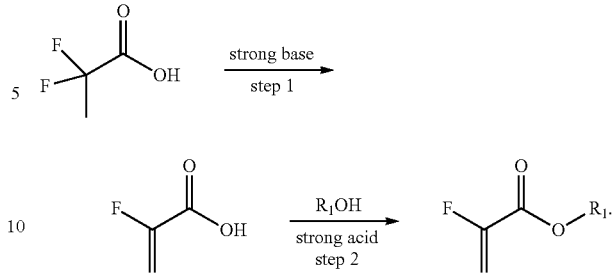

The starting material, diflouropropionic acid, is a solid with melting point around 41° C. This compound has been used in Japan as a selective herbicide. (S Watanabe and Y Nomura, α,α-Difluoropropionates as selective herbicide, JP 55069501 A, 1980) Two inexpensive ways of making difluoropropionic acid have been reported, (a) via chloro-fluoro butane, (A Henne and W J Zimmerschied. Fluorinated Acid. J. Am. Chem. Soc. 1947, 89, 281-283) and (b) via pyruvate and arylsulfur trifluorides, (such as Fluolead™) or sulfur fluorides and their derivatives (SF reagents), in particular SF₄ reagents. (C-L J Wang, 1985) Thus, the use of difluoropropionic acid provides the advantage of low cost.

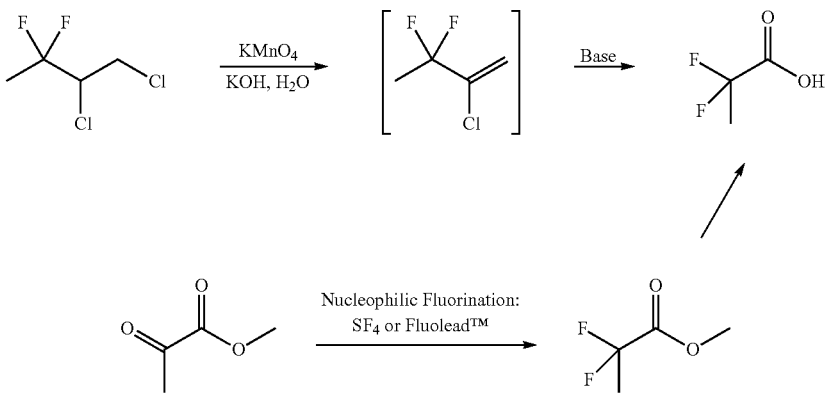

In the first step, the dehydrofluorination, difluoropropionic acid is combined with KMnO₄, KOH and H₂O. The second step, the methyl ester formation, has been reported with good yield. This reaction requires a strong base, e.g. sodium methoxide or sodium hydroxide. Weak bases, such as sodium carbonate, or calcium hydroxide do not work well for this reaction. Dehydroflurorination is very slow at temperature below 100° C. At very high temperature, side reaction such as polymerization reaction will occur. The desired temperature range is between about 100° C. to about 130° C. when DMSO is the solvent and sodium methoxide is the base.

A polar solvent with high boiling point works well for this reaction. For example, the solvent can be dimethyl sulfoxide (DMSO), water, N-methyl-2-pyrrolidone (NMP), dimethylacetamide (DMA), or a combination thereof; preferably, the solvent is DMSO, water, or a combination thereof.

Because 2-fluoroacrylic acid is very reactive, at higher concentration, a greater amount of the polymerization reaction is observed even in the presence of butylated hydroxytoluene (BHT). A lower concentration of 2-fluoroacrylic acid is helpful to reduce the side reactions and the overall large volume is not feasible for large scale synthesis. A suitable concentration range is between about 1 M and about 2 M.

Additionally, the disclosure includes a process for preparing patiromer calcium sorbitex comprising preparing the fluoroacrylate of Formula 2A by the process described herein; forming a polymerization reaction mixture comprising divinyl benzene, 1,7-octadiene, and the fluoroacrylate of Formula 2A to form crosslinked alkyl(2-fluoroacrylate)-divinylbenzene-1,7-octadiene polymer; deprotecting the crosslinked alkyl(2-fluoroacrylate)-divinylbenzene-1,7-octadiene polymer to form crosslinked (2-fluoroacrylate)-divinylbenzene-1,7-octadiene polymer; contacting the crosslinked (2-fluoroacrylate)-divinylbenzene-1,7-octadiene polymer with a calcium salt to form crosslinked (calcium 2-fluoroacrylate)-divinylbenzene-1,7-octadiene polymer; swelling the crosslinked (calcium 2-fluoroacrylate)-divinylbenzene-1,7-octadiene polymer and contacting with sorbitol to form patiromer calcium sorbitex.

The polymerization reaction mixture comprises divinyl benzene, 1,7-octadiene, the fluoroacrylate of Formula 2A, and a polymerization initiator.

The polymerization initiator comprises lauroyl peroxide.

The process described herein includes deprotecting the crosslinked alkyl(2-fluoroacrylate)-divinylbenzene-1,7-octadiene polymer to form crosslinked (2-fluoroacrylate)-divinylbenzene-1,7-octadiene polymer comprises hydrolyzing the crosslinked alkyl(2-fluoroacrylate)-divinylbenzene-1,7-octadiene polymer.

The process includes hydrolyzing the crosslinked alkyl (2-fluoroacrylate)-divinylbenzene-1,7-octadiene polymer comprises contacting the crosslinked alkyl(2-fluoroacrylate)-divinylbenzene-1,7-octadiene polymer with a strong base.

The strong base is an aqueous strong base.

The aqueous strong base comprises sodium hydroxide, potassium hydroxide, rubidium hydroxide, cesium hydroxide, or a combination thereof; preferably, the aqueous strong base comprises sodium hydroxide.

When the strong base of sodium hydroxide is used, the process includes the (2-fluoroacrylate)-divinylbenzene-1,7-octadiene polymer being formed is crosslinked (sodium 2-fluoroacrylate)-divinylbenzene-1,7-octadiene polymer.

The process includes contacting the crosslinked (2-fluoroacrylate)-divinylbenzene-1,7-octadiene polymer with the calcium salt to form crosslinked (calcium 2-fluoroacrylate)-divinylbenzene-1,7-octadiene polymer comprising slurrying the crosslinked (2-fluoroacrylate)-divinylbenzene-1,7-octadiene polymer with the calcium salt.

The process also includes contacting the crosslinked (2-fluoroacrylate)-divinylbenzene-1,7-octadiene polymer with the calcium salt to form crosslinked (calcium 2-fluoroacrylate)-divinylbenzene-1,7-octadiene polymer comprising slurrying the crosslinked (sodium 2-fluoroacrylate)-divinylbenzene-1,7-octadiene polymer with the calcium salt.

The calcium salt comprises calcium chloride, calcium bromide, calcium iodide, or a combination thereof.

The process further includes swelling the crosslinked (calcium 2-fluoroacrylate)-divinylbenzene-1,7-octadiene polymer by slurrying the polymer in a solution comprising sorbitol.

The solution comprising sorbitol is an aqueous sorbitol solution.

The crosslinked cation exchange polymer (e.g., patiromer calcium sorbitex) can be synthesized by preparing an organic phase and an aqueous phase. The organic phase typically contains a polymerization initiator, a fluoroacrylate of Formula 2A, 1,7-octadiene, and divinyl benzene. The aqueous phase generally contains a polymerization suspension stabilizer, a water soluble salt, water, and optionally a buffer. The organic phase and the aqueous phase are then combined and stirred under nitrogen. The mixture is generally heated to about 60° C. to about 80° C. for about 2.5 to about 3.5 hours, allowed to rise up to 95° C. after polymerization is initiated, and then cooled to room temperature. After cooling, the aqueous phase is removed. Water is added to the mixture, the mixture is stirred, and the resulting solid is filtered. The solid is washed with water, alcohol, or alcohol/water mixtures.

As described above, polymerization suspension stabilizers, such as polyvinyl alcohol, are used to prevent coalescence of particles during the polymerization process. Further, it has been observed that the addition of sodium chloride in the aqueous phase decreases coalescence and particle aggregation. Other suitable salts for this purpose include salts that are soluble in the aqueous phase. Water soluble salts can be added at a concentration of from about 0.1 wt. % to about 10 wt. %, particularly from about 2 wt. % to about 5 wt. %, and even more particularly from about 3 wt. % to about 4 wt. %.

Preferably, an organic phase of methyl 2-fluoroacrylate (90 wt. %), 1,7-octadiene (5 wt. %) and divinylbenzene (5 wt. %) is prepared and 0.5 wt. % of lauroyl peroxide is added to initiate the polymerization reaction. Additionally, an aqueous phase of water, polyvinyl alcohol, phosphates, sodium chloride, and sodium nitrite is prepared. Under nitrogen and while keeping the temperature below about 30° C., the aqueous and organic phases are mixed together. Once mixed completely, the reaction mixture is gradually heated with continuous stirring. After the polymerization reaction is initiated, the temperature of the reaction mixture is allowed to rise up to about 95° C. Once the polymerization reaction is complete, the reaction mixture is cooled to room temperature and the aqueous phase is removed. The solid can be isolated by filtration once water is added to the mixture. The filtered solid is washed with water and then with a methanol/water mixture. The resulting product is a crosslinked (methyl 2-fluoroacrylate)-divinylbenzene-1,7-octadiene terpolymer.

As discussed herein, after polymerization, the product may be hydrolyzed or otherwise deprotected by methods known in the art. For hydrolysis of the polymer having ester groups to form a polymer having carboxylic acid groups, preferably, the polymer is hydrolyzed with a strong base (e.g., sodium hydroxide, potassium hydroxide, magnesium hydroxide, or calcium hydroxide) to remove the alkyl (e.g., methyl) group and form the carboxylate salt. Alternatively, the polymer can be hydrolyzed with a strong acid (e.g., hydrochloric acid) to form the carboxylate salt. Preferably, the (methyl 2-fluoroacrylate)-divinylbenzene-1,7-octadiene terpolymer is hydrolyzed with an excess of aqueous sodium hydroxide solution at a temperature from about 30° C. to about 100° C. to yield (sodium 2-fluoroacrylate)-divinylbenzene-1,7-octadiene terpolymer. Typically, the hydrolysis reaction is carried out for about 15 to 25 hours. After hydrolysis, the solid is filtered and washed with water and/or an alcohol.

The cation of the polymer salt formed in the hydrolysis reaction or other deprotection step depends on the base used in that step. For example, when sodium hydroxide is used as the base, the sodium salt of the polymer is formed. This sodium ion can be exchanged for another cation by contacting the sodium salt with an excess of an aqueous metal salt to yield an insoluble solid of the desired polymer salt. After the desired ion exchange, the product is washed with an alcohol and/or water and dried directly or dried after a dewatering treatment with denatured alcohol; preferably, the product is washed with water and dried directly. For example, the sodium salt of the cation exchange polymer is converted to the calcium salt by washing with a solution that substitutes calcium for sodium, for example, by using calcium chloride, calcium acetate, calcium lactate gluconate, or a combination thereof. And, more specifically, to exchange sodium ions for calcium ions, the (sodium 2-fluoroacrylate)-divinylbenzene-1,7-octadiene terpolymer is contacted with an excess of aqueous calcium chloride to yield an insoluble solid of crosslinked (calcium 2-fluoroacrylate)-divinylbenzene-1,7-octadiene terpolymer.

Using this suspension polymerization process, crosslinked polyMeFA polymer is isolated in good yield, generally above about 85%, more specifically above about 90%, and even more specifically above about 93%. The yield of the second step (i.e., hydrolysis) preferably occurs in 100%, providing an overall yield above about 85%, more specifically above about 90%, and even more specifically above about 93%.

To add sorbitol to the sorbitol stabilized compositions, the salt of the polymer is swelled and contacted with a solution of sorbitol (e.g., slurried with an aqueous solution of sorbitol), typically with the slurry containing an excess amount of sorbitol based on polymer weight. The slurry is maintained for at least 3 hours and ambient temperature and pressure. The solids are then filtered off and dried to desired moisture content.

Unless otherwise indicated, an alkyl group as described herein alone or as part of another group is an optionally substituted linear saturated monovalent hydrocarbon radical containing from one to twenty carbon atoms and preferably one to eight carbon atoms, or an optionally substituted branched saturated monovalent hydrocarbon radical containing three to twenty carbon atoms, and preferably three to eight carbon atoms. Examples of unsubstituted alkyl groups include methyl, ethyl, n-propyl, i-propyl, n-butyl, i-butyl, s-butyl, t-butyl, n-pentyl, i-pentyl, s-pentyl, t-pentyl, and the like.

The term "aryl" as used herein alone or as part of another group denotes an optionally substituted monovalent aromatic hydrocarbon radical, preferably a monovalent monocyclic or bicyclic group containing from 6 to 12 carbons in the ring portion, such as phenyl, biphenyl, naphthyl, substituted phenyl, substituted biphenyl or substituted naphthyl. Phenyl and substituted phenyl are the more preferred aryl groups. The term "aryl" also includes heteroaryl.

The terms "about" and "around" are to signify that the respective exact value is designated, or that the approximate value is designated. Thus, for example, "at least about 1,000" shall, be interpreted to mean "at least 1,000" and, be interpreted to mean "at least approximately 1,000."

Having described the invention in detail, it will be apparent that modifications and variations are possible without departing from the scope of the invention defined in the appended claims.

EXAMPLES

The following non-limiting examples are provided to further illustrate the present invention.

The methods of analysis used were thin layer chromatography (TLC) and gas chromatography-mass spectrometry (GC-MS).

The progress of the reactions was monitored by TLC with silica gel plates. The solvent used was a mixture of ethyl acetate, heptane, and toluene in the volume ratio of 3:1:1, respectively And the visualization was carried out under UV light (254 nm) or with $KMNO_4$ reagent.

GC-MS Analysis Method A was used in analysis for example 5 and 7. The following parameters were used. For both examples 5 and 7: GC Instrument: Agilent 7890A; Solvent: dichloromethane; Column: Agilent HP-5 ms; Pressure 36 kPa; Inlet Temperature: 250° C.; Injection volume: 1.0 µL; Split 5:1 for example 5, Split 23:1 for example 7.

For example 5, the temperature parameters were: (1) Rate 2° C./minute, value 50° C.; (2) Rate 10° C./minute, value 240° C., hold time 10 minutes.

For example 7, the temperature parameters were: (1) Rate 10° C./minute, value 240° C., hold time 5 minutes.

For the GS-MS Analysis Method A, further detector parameters were: GC/MS: Agilent 597x MSD; Ion Source: EI; Source Temperature: 230° C.; Quad Temperature: 150° C.; Fixed Electron Energy: 70 eV; and Scan time segments: time 0.5, start mass 45, end mass 550.

GC measurement Method B. For the GC-FID measurement of example 7 and 8 the following method parameter were used. GC Instrument: Agilent 6850; Solvent: dichloromethane; Column: Zebron ZB-5; Column Pressure: 18 kPa; Inlet Temperature: 250° C.; Injection volume: 1.0 µL; Split 100:1. The temperature parameters were: (1) Rate 2° C./minute, value 240° C., hold time 5 minutes; (2) Rate 10° C./minutes.

Example 1: Synthesis of MFA Using Methyl Propiolate Route (DMPU-HF)

Methyl propiolate (472.5 mg, 5.62 mmol), 999.38 mg DMPU-HF, 72.11 mg Au catalyst and 2.5 mL dichloroethane (DCE) were added into a reaction vessel fitted with a stirrer. The reaction temperature was held at 55° C. for 3 hours. After completion of the reaction, a conversion of approximately 90% was observed by HPLC; the product peak had the same retention time as MFA. The regio-selectivity of this reaction will need to be confirmed using 1H NMR analysis.

The DMPU reagent cannot be removed through aqueous workup. Distillation can be used to separate the MFA product from the DCE solvent, but is challenging because the boiling point of MFA (91° C.) and DCE (84° C.) are close. (OE Okoromoba, et al. 2014, at S7 (supporting information))

Example 2: Synthesis of MFA using Methyl Propiolate Route ($KHSO_4$-13HF, Au Catalyst)

Methyl propiolate (84.07 mg, 1.0 mmol), 198 mg $KHSO_4$-13HF, 1 mL of 0.01 M of Au catalyst in DCE, and 1 mL dichloroethane (DCE) were added into a reaction vessel fitted with a stirrer. The reaction temperature was held at 55° C. for 3 hours. After completion of the reaction, a conversion of approximately 85% was observed by HPLC; the product peak had the same retention time as MFA. The regio-selectivity of this reaction also will be confirmed using 1H NMR analysis.

In a comparison reaction without the Au catalyst, no MFA product was observed on HPLC.

Example 3: Synthesis of MFA Precursor Using Halogen Exchange Route

The reactants were combined in a stainless-steel hydrothermal autoclave reactor with a Teflon chamber. The chamber was equipped with a stirring bar and reactants were sealed tightly in the autoclave reactor. The reaction was heated in an oil bath or dry armor chip bath. Since this reactor does not have an internal temperature control, the external bath temperature was recorded.

$SnCl_4$ was used as Lewis acid catalyst at 0.18 mole ratio to the starting material. At 80° C., no desired product formation was observed, while at 150° C., 2-chloroacrylic acid was observed as a major product. At temperature range from 100-120° C., desired product formation was observed on GC/MS.

The mole ratio of the starting material to $KHSO_4$-13HF reagent was 1 to 0.61. Since the HF content in the reagent is 65 wt %, the mole ratio of HF to dichloropropanoic acid is 7.9 to 1.

Example 4: Synthesis of MFA Precursor Using Methyl Acrylate-Epoxide Route ($KHSO_4$-13HF, in DCE)

The first step, synthesis of methyl oxirane-2-carboxylate, was reported with 80% yield (B Ochiai and T Hirano, 2014). Methyl oxirane-2-carboxylate (102 mg, 1 mmol) was dissolved in 2 mL of DCE and cooled to 0° C. $KHSO_4$-13HF (435 mg, 1.1 mmol) was added to the solution dropwise while stirring. The reaction was stirred at room temperature overnight. Both starting material and epoxide opening product were observed. The GC retention time of epoxide opening product matched the retention time of desired product, methyl 2-fluoro-3-hydroxypropanoate. In addition, impurities at higher retention time were observed, which are possible products from epoxide polymerization.

Example 5: Synthesis of MFA Precursor Using Methyl Acrylate-Epoxide Route ($KHSO_4$-13HF, Neat)

Methyl oxirane-2-carboxylate (5.0 g, 49 mmol) was added into a PTFE vial and cooled to 0° C. $KHSO_4$-13HF (3.04 g, 7.7 mmol $KHSO_4$-13HF reagent, means 2.03 equivalents of HF (99.57 mmol HF)) was added to the solution dropwise while stirring. The reaction was stirred for 21 hours at room temperature overnight. The crude solution was then poured onto ice and basified with sat. $KHCO_3$ solution. The phases were extracted three times with dichloromethane. The organic layer were combined. After GC-MS measurement, the desired product methyl 2-fluoro-3-hydroxypropanoate (retention time 14.0 min) was found. Besides the desired product, the potential regioisomer methyl 3-fluoro-2-hydroxypropanoate (retention time 9.4 minutes) and an unknown epoxide opening/elimination product (retention time 17.4 minutes) was observed. The desired product was compared to a reference standard GC-MS spectra of methyl 2-fluoro-3-hydroxypropanoate.

Analysis Method A: MS (GC/MS, 70 eV, EI) m/z [fragment]: 121 [$C_4H_6FO_3^+$], 92 [$C_3H_5FO_2^+$], 77 [$C_3H_6FO^+$], 63 [$C_2H_4FO^+$], 60 [$C_2HFO^+$], 59 [$C_2H_3O_2^+$], 46 [$C_3H_5FO_2^{2+}$].

Example 6: Synthesis of MFA Precursor Using One-Pot Methyl Acrylate-Epoxide Route (m-CPBA and $KHSO_4$-13HF)

A PTFE vial was charged with m-CPBA 77% w/w (900 mg, 4 mmol, 2 equiv). DCM (20 mL) was added and the resulting solution was cooled down in an ice bath. After 30 minutes, methyl acrylate (2 mmol) was added followed by $KHSO_4$-13HF as the HF source (400 µL 0.67 mmol, 0.33 eq $KHSO_4$-13HF or 4.4 mmol an HF). The reaction mixture was stirred over night at room temperature. After stirring poured on ice and basified with saturated $KHCO_3$ solution and stirred for 30 additional minutes. The reaction mixture was then extracted with DCM (3×50 mL), the combined organic layers dried over $MgSO_4$, filtered and concentrated under reduced pressure. The residue obtained was purified by flash chromatography using appropriate mixtures of heptane and ethyl acetate as eluent (7:3, Rf (desired product) =0.4, matched with Rf of purchased reference material methyl 2-fluoro-3-hydroxypropanoate). Besides to desired product formation methyl glycidate (starting material) and potential regioisomer were obtained.

$R_f$(methyl 2-fluoro-3-hydroxypropanoate)=0.4 (Ethyl acetate:Heptane:Toluene, 3:1:1)

Example 7: Synthesis of methyl 2,3-difluoropropionate using Methyl Acrylate-Epoxide Route ($SF_4$)

To a 250 ml stainless-steel autoclave, methyl glycidate (20 g, 0.20 mol, 1.0 eq) was charged as a solution in DCM (20 mL) with an internal charge of the reagent NaF (10.3 g, 0.25 mol, 1.25 eq) added prior to pressurising the autoclave with $SF_4$ (2 wt. equivalent to methyl glycidate, 44.3 g, 0.41 mol, 2.1 eq). The reaction mixture was heated to 85° C. for 12 hours before being quenched on to ice-cold $KHCO_3$. After quenching on to ice-cold $KHCO_3$ solution, NMR and GC-FID and GC-MS analysis confirmed incomplete consumption of starting material (58.3% by GC-FID, Method B). Whilst high boiling side products and multiple minor side products (approximately 18% area by GC-FID, Method B) were observed by GC-FID, desired vicinal difluoride product methyl 2,3-difluoropropionate was observed (24.0% area by GC-FID, Method B).

Analysis Method A: Retention times in GC/MS Analysis: Methyl 2,3-difluoropropionate=4.85 min, Methyl glycidate=7.69 min MS (GC/MS, 70 eV, EI) m/z [fragment]: 123 [$C_4H_5F_2O_2^+$], 93 [$C_3H_3F_2O^+$], 91 [$C_3H_4FO_2^+$], 73.0 [$C_3H_5O_2^+$], 65 [$C_2H_3F_2^+$], 59 [$C_2H_3O_2^+$], 46 [$C_3H_5FO_2^+$].

Example 8: Synthesis of MFA Using Example 7 and Triethylamine as Base

A solution of example 7 of the difluoro compound methyl 2,3-difluoropropionate (0.5 g, 4.0 mmol, 1 eq), triethylamine (0.49 g, 0.67 mL, 4.8 mmol, 1.2 eq), and BHT (4.9 mg, 0.02 mmol, 0.0055 eq) in DCM (20 mL) was stirred at 37° C. for 87 hours. The reaction was stopped, worked up and the solvent was removed under atmospheric distillation. The desired product MFA (Retention time 3.5 min by GC-FID, Method B) was found besides starting material Methyl 2,3-difluoropropionate (Retention time 4.3 min by GC-FID, Method B) and BHT (Retention time 12.2 minutes by GC-FID, Method B). The resulting MFA was compared to a reference standard of MFA.

Example 9: Synthesis of MFA using Difluoropropionic Acid (diFPA) Route

Difluoropropionic acid (0.5 g, 4.5 mmol) was dissolved in 2 mL of DMSO. To the solution was added sodium methoxide (0.74 g, 13.6 mmol). The reaction mixture was stirred at 120° C. for 3 hours, and the formation of 2-fluoroacrylic acid was observed. Methanol ($CH_3OH$) and sulfuric acid ($H_2SO_4$) were added to 2-fluoroacrylic acid to produce MFA. (K Cho, et al., 2019)

Example 10: Patiromer Calcium Sorbitex (i.e., Sorbitol-Loaded, Crosslinked (calcium 2-fluoroacrylate)-divinylbenzene-1,7-octadiene Copolymer)

Methyl 2-fluoroacrylate (MeFA) is prepared as above in Example 1. Divinylbenzene (DVB) is purchased from Aldrich, technical grade, 80%, mixture of isomers, and is used as received. 1,7-octadiene (ODE), lauroyl peroxide (LPO), polyvinyl alcohol (PVA) (typical molecular weight 85,000-146,000, 87-89% hydrolyzed), sodium chloride (NaCl), sodium phosphate dibasic heptahydrate ($Na_2HPO_4 \cdot 7H_2O$) and sodium phosphate monobasic monohydrate ($NaH_2PO_4 \cdot H_2O$) are purchased from commercial sources and used as received.

In an appropriately sized reactor with appropriate stirring and other equipment, a 90:5:5 weight ratio mixture of organic phase of monomers is prepared by mixing methyl 2-fluoroacrylate, 1,7-octadiene, and divinylbenzene. One-half part of lauroyl peroxide is added as an initiator of the polymerization reaction. A stabilizing aqueous phase is prepared from water, polyvinyl alcohol, phosphates, sodium chloride, and sodium nitrite. The aqueous and monomer phases are mixed together under nitrogen at atmospheric pressure, while maintaining the temperature below 30° C. The reaction mixture is gradually heated while stirring continuously. Once the polymerization reaction has started, the temperature of the reaction mixture is allowed to rise to a maximum of 95° C.

After completion of the polymerization reaction, the reaction mixture is cooled and the aqueous phase is removed. Water is added, the mixture is stirred, and the solid material is isolated by filtration. The solid is then washed with water to yield a crosslinked (methyl 2-fluoroacrylate)-divinylbenzene-1,7-octadiene copolymer. The crosslinked (methyl 2-fluoroacrylate)-divinylbenzene-1,7-octadiene copolymer is hydrolyzed with an excess of aqueous sodium hydroxide solution at 90° C. for 24 hours to yield crosslinked (sodium 2-fluoroacrylate)-divinylbenzene-1,7-octadiene copolymer. After hydrolysis, the solid is filtered and washed with water. The crosslinked (sodium 2-fluoroacrylate)-divinylbenzene-1,7-octadiene copolymer is exposed at room temperature to an excess of aqueous calcium chloride solution to yield insoluble cross-linked (calcium 2-fluoroacrylate)-divinylbenzene-1,7-octadiene copolymer.

After the calcium ion exchange, the wet polymer is slurried with 25-30% w/w aqueous solution of sorbitol at ambient temperature to yield sorbitol-loaded polymer. Excess sorbitol is removed by filtration. The resulting polymer is dried at 20-30° C. until the desired moisture content (10-25 w/w/%) is reached. This provided a solid patiromer calcium sorbitex (i.e., sorbitol-loaded, crosslinked (calcium 2-fluoroacrylate)-divinylbenzene-1,7-octadiene copolymer).

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above compositions and processes without departing from the scope of the invention, it is intended that all matter contained in the above description and shown in the accompanying drawings shall be interpreted as illustrative and not in a limiting sense.

The invention claimed is:

1. A process for preparing a fluoroacrylate compound of Formula 2A comprising contacting a compound of Formula 5 with an epoxidation agent and a fluorination agent to form the compound of Formula 2A; the compound of Formula 5 corresponding to the following structure:

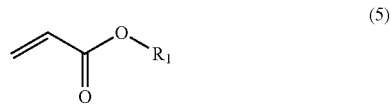

(5)

wherein
$R_1$ is alkyl or aryl; and
the compound of Formula 2A corresponding to the following structure:

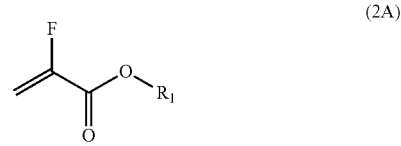

(2A)

wherein
$R_1$ is defined above, wherein the fluorination agent is selected from $KHSO_4$-13HF, $SF_4$ or 4-tert-butyl-2,6-dimethylphenylsulfur trifluoride.

2. The process of claim 1, wherein the fluorination agent comprises $KHSO_4$-13HF.

3. The process of claim 1, wherein the compound of Formula 5 is reacted with the epoxidation agent to form a terminal epoxide group and then is reacted with the fluorination agent to open the epoxide ring.

4. The process of claim 3, wherein the reaction of the compound of Formula 5 with the epoxidation agent and the fluorination agent is performed in one vessel.

5. The process of claim 1, wherein the fluorination agent comprises $SF_4$.

6. The process of claim 1, wherein the fluorination agent comprises 4-tert-butyl-2,6-dimethylphenylsulfur trifluoride.

7. The process of claim 1, wherein the epoxidation agent is NaOCl.

8. The process of claim 1, wherein the epoxidation agent is meta-chloroperoxybenzoic acid.

9. The process of claim 1, wherein $R_1$ is $C_1$ to $C_6$ alkyl.

10. The process of claim 1, wherein $R_1$ is $C_1$ to $C_3$ alkyl.

11. The process of claim 1, wherein $R_1$ is methyl or ethyl.

12. The process of claim 1, wherein $R_1$ is methyl.

13. A process for preparing patiromer calcium sorbitex comprising
preparing the fluoroacrylate of Formula 2A by the process of claim 1;
forming a polymerization reaction mixture comprising divinyl benzene, 1,7-octadiene, and the fluoroacrylate of Formula 2A to form crosslinked alkyl(2-fluoroacrylate)-divinylbenzene-1,7-octadiene polymer;

deprotecting the crosslinked alkyl(2-fluoroacrylate)-divinylbenzene-1,7-octadiene polymer to form crosslinked (2-fluoroacrylate)-divinylbenzene-1,7-octadiene polymer;

contacting the crosslinked (2-fluoroacrylate)-divinylbenzene-1,7-octadiene polymer with a calcium salt to form crosslinked (calcium 2-fluoroacrylate)-divinylbenzene-1,7-octadiene polymer;

swelling the crosslinked (calcium 2-fluoroacrylate)-divinylbenzene-1,7-octadiene polymer and contacting with sorbitol to form patiromer calcium sorbitex.

14. The process of claim 13, wherein deprotecting the crosslinked alkyl(2-fluoroacrylate)-divinylbenzene-1,7-octadiene polymer to form crosslinked (2-fluoroacrylate)-divinylbenzene-1,7-octadiene polymer comprises hydrolyzing the crosslinked alkyl(2-fluoroacrylate)-divinylbenzene-1,7-octadiene polymer.

15. The process of claim 14, wherein hydrolyzing the crosslinked alkyl(2-fluoroacrylate)-divinylbenzene-1,7-octadiene polymer comprises contacting the crosslinked alkyl(2-fluoroacrylate)-divinylbenzene-1,7-octadiene polymer with a strong base.

16. The process of claim 15, wherein the strong base selected from sodium hydroxide, potassium hydroxide, rubidium hydroxide, cesium hydroxide, or a combination thereof.

17. The process of claim 13, wherein contacting the crosslinked (2-fluoroacrylate)-divinylbenzene-1,7-octadiene polymer with the calcium salt to form crosslinked (calcium 2-fluoroacrylate)-divinylbenzene-1,7-octadiene polymer comprises slurrying the crosslinked (2-fluoroacrylate)-divinylbenzene-1,7-octadiene polymer with the calcium salt.

18. The process of claim 13, wherein the calcium salt is selected from calcium chloride, calcium bromide, calcium iodide, or a combination thereof.

19. The process of claim 13, wherein the swelling of the crosslinked (calcium 2-fluoroacrylate)-divinylbenzene-1,7-octadiene polymer comprises slurrying the polymer in a solution comprising sorbitol.

* * * * *